United States Patent [19]

Walter et al.

[11] 4,196,961

[45] Apr. 8, 1980

[54] OPTICAL APPARATUS FOR CORRECTING THE SPHERICAL ABERRATION OF A SPHERICAL CONCAVE MIRROR

[75] Inventors: Arthur Walter, Waldkirch; Günter Fetzer, Gundelfingen, both of Fed. Rep. of Germany

[73] Assignee: Erwin Sick Gesellschaft mit beschrankter Haftung Optik-Elektronik, Waldkirch, Fed. Rep. of Germany

[21] Appl. No.: 780,385

[22] Filed: Mar. 23, 1977

[30] Foreign Application Priority Data

May 18, 1976 [DE] Fed. Rep. of Germany ....... 2622113

[51] Int. Cl.² ............................................. G02B 27/17
[52] U.S. Cl. ..................................... 350/6.8; 350/204; 356/386
[58] Field of Search ................... 350/200, 204, 6.8; 356/158, 167, 160, 386, 387; 250/224

[56] References Cited

U.S. PATENT DOCUMENTS

| | | | |
|---|---|---|---|
| 2,429,462 | 10/1947 | Henroteau | 350/200 |
| 2,449,259 | 9/1948 | Van Alphen | 350/200 |
| 2,812,685 | 11/1957 | Vossberg | 356/160 |
| 2,971,695 | 2/1961 | Sick | 250/224 |
| 3,244,073 | 4/1966 | Bouwers | 350/200 |
| 3,752,599 | 8/1973 | Rosin | 350/204 |
| 4,025,796 | 5/1977 | Erdmann | 250/560 |

*Primary Examiner*—Conrad J. Clark
*Attorney, Agent, or Firm*—Townsend and Townsend

[57] ABSTRACT

An optical apparatus for use in conjunction with spherically shaped concave mirrors for substantially eliminating aberrations in the reflections from such mirror. The mirror cooperates with a light source or a light receiver placed in the vicinity of but off-set relative to the natural focal point of the mirror. A plane parallel, transparent plate is placed between the mirror and the light source or receiver and it has a size so as to intercept light rays between the mirror and the light source or receiver and which respectively result in or are caused by light beams oriented parallel to the optical axis of the mirror. Use of the invention for additionally correcting astigmatism and chromatic aberrations caused by spherical mirrors is disclosed. Also disclosed is the use of the invention in connection with large spherical mirrors forming part of light curtain arrangements.

13 Claims, 7 Drawing Figures

OPTICAL APPARATUS FOR CORRECTING THE SPHERICAL ABERRATION OF A SPHERICAL CONCAVE MIRROR

BACKGROUND OF THE INVENTION

The invention relates to an optical apparatus for correcting the spherical aberration of a spherical concave mirror.

Whereas parabolic mirrors provide an absolutely parallel light beam when a punctiform light source is arranged in their focus, in the case of spherical concave mirrors parallelism to the optical axis can only be assumed in the case of light rays close to the axis. In the case of abaxial rays, the parallelism error increases with the distance from the optical axis. As spherical concave mirrors can be manufactured much more economically and accurately than parabolic mirrors, particularly above particular size limits, attempts have been made to eliminate by optical correction elements the parallelism error of a spherical concave mirror, which is also called the spherical abberation. The Schmidt correction plate and the Mangin mirror proposed for this purpose have the disadvantage that their manufacture, particularly when fulfilling the necessary high precision requirements is very expensive.

BRIEF SUMMARY OF THE INVENTION

The problem of the invention is therefore to remove the spherical aberration of a spherical concave mirror to the extent necessary for practical purposes and at limited cost.

According to the invention this problem is solved in that a transparent coplanar plate is positioned between the concave mirror and a distance $r/2 + d \cdot (n - 1/n)$, whereby r is the radius of the concave mirror, d the thickness of the plate and n the refractive index of the plate, whereby an angular range of $< \pm 45°$ is used, based on the centre of the concave mirror. For the purposes of this definition it is assumed that the coplanar plate is arranged in air. If the correction plate is arranged in a medium whose refractive index is not equal to 1, it is easily possible to carry out a corresponding conversion of the maximum distance (image distance) from the concave mirror measured on the optical axis. The use of a coplanar correction plate makes it possible to substantially eliminate the spherical aberration of rays which are more remote from the optical axis of the concave mirror, in addition to those which are close to said axis, so that by suitable choice of the useful angle range of the concave mirror and the plate parameters, the spherical aberration can be kept below a predetermined absolute value within the complete useful angular range. It is surprising that this is possible through suitable dimensioning and a suitable refractive index of a coplanar plate. It is possible to manufacture economically coplanar plates with an adequate precision level.

At least in a plane containing the optical axis, the plate is advantageously positioned at right angles to the optical axis. According to a first advantageous embodiment, the plate is at right angles to the optical axis, whereby the emergent and incident rays pass through the plate. Therefore a light beam which enters or emerges from the correction plate parallel to the optical axis is not influenced by the correction plate. Only those rays which pass from the focus to the concave mirror or from the concave mirror to the focus are subject to the correction within the plate according to the present invention.

According to another advantageous embodiment, the plate is only perpendicular to the optical axis in a plane containing said axis, whereby the plate is displaced to such an extent from the optical axis that it does not intercept either the parallel, emergent or, respectively, the incident beam. In this embodiment, the parallel beam not intercepted by the plate and which passes either from or to the concave mirror is at an angle to the optical axis, so that said displacement of the correction plate relative to the optical axis makes it possible for the parallel light beam to pass by the correction plate. As in such an optical arrangement there is a more or less pronounced astigmatism, and more specifically in such an instance the line along which the light beam scans over the mirror becomes curved to an extent which depends on the angle of the parallel beam to the optical axis, a further preferred embodiment of the invention stipulates that the plate is not arranged at right angles to the plane of the incident and emergent beam relative to the projection of the rays passing throught it, but is instead additionally tilted by an angle which eliminates such astigmatism caused by the angle between the optical axis and the parallel beam. Thus, without additional expenditure, the correction plate according to the invention can be used for eliminating a further optical error.

If chromatic aberrations occur through the use of multicoloured light, according to a further embodiment of the invention the coplanar plate can comprise a plurality of layers, which have different Abbe numbers in such a way that chromatic aberrations are corrected. The various layers must therefore have different dependences of the refractive index from the wave length.

According to the invention, the plate parameters are determined in such a way that the displacement of the focal point for areas close to the axis is at least approximately obtained for two further angles within the useful range of the concave mirror. The plate parameters are preferably determined by the Chebyshev approximation, which means that the absolute error in the complete useful angle range is smaller than a predetermined value.

If the incident or emergent parallel light beam does not pass through the correction plate but travels alongside it, the plate advantageously has such a trapezoidal shape in the plane of the light beam passing through it that the peripheral rays corresponding to the largest useful angle of the concave mirror are just intercepted at the inclined edges. In other words, the plate dimensions are limited to those areas which are optically necessary, resulting in a considerable saving of space and material.

The apparatus according to the invention can be used wherever a spherical concave mirror has hitherto been unusable due to the spherical aberration. Thus, it can be used for example in astronomical reflecting telescopes.

The invention can be used with particular advantage in an apparatus with a light ray deflecting device for producing a light curtain. In this case, the coplanar plate is arranged between the concave mirror and the light ray deflecting device and the reflecting surface of said device is, as a function of the plate parameters, arranged at such a distance from half the radius of the concave mirror that the spherical aberration is minimal according to the Chebyshev approximation. In this embodiment, there is somewhat less space for arranging the correction plate according to the invention, because account must also be taken of the movement range of the light ray deflecting device.

The invention is used with particular advantage in the case of an apparatus with a spherical concave mirror, a mirror wheel and a light source which illuminates the mirror wheel, whereby the association of the optical elements is such that on rotating the mirror wheel in front of the concave mirror a light curtain is formed comprising a scanning beam displaced parallel to itself. In this case the invention is characterised in that the centre of rotation of the mirror wheel is displaced from the centre of the concave mirror in the direction of said mirror by a distance $r/2 - a/2 + k$, whereby r is the concave mirror radius, a the mirror wheel diameter defined by the spacing between two facing mirror surfaces and k a constant, which by means of the Chebyshev approximation is determined in such a way that the spherical aberration is minimal. Even without using the coplanar correction plate, this embodiment is important because in the case of a suitable selection of constant k, the spherical aberration can be made equal to zero not only in the case of rays which are close to the axis but also when they are some distance from said axis, so that in certain circumstances, even without the correction plate according to the invention, the absolute error within the useful angle range can be kept below a predetermined value. The simultaneous use of the correction plate according to the invention is preferred however, because it brings about a further significant decrease of the spherical aberration.

A preferred method for the optimization of the setting of the apparatus according to the invention with an incorporated coplanar plate is characterised in that assuming $k=0$ initially for the maximum useful angle of the concave mirror, the spherical aberration caused by the mirror wheel is substantially made to disappear by suitable choice of the parameters of the coplanar plate, whereby subsequently through selecting a suitable value for k, the negative and positive spherical errors within the useful angle range are made substantially the same. Thus, for k initially certain assumptions are made after which the calculation process is repeated to establish in what way the spherical aberration has changed. It is thus possible to approximately find the minimum absolute error.

BRIEF DESCRIPTION OF THE DRAWINGS

Hereinafter, the invention is explained in exemplified manner relative to non-limitative embodiments and with reference to the attached drawings, wherein show.

DETAILED DESCRIPTION OF THE PREFERRED EMBODIMENTS

Figure 1:
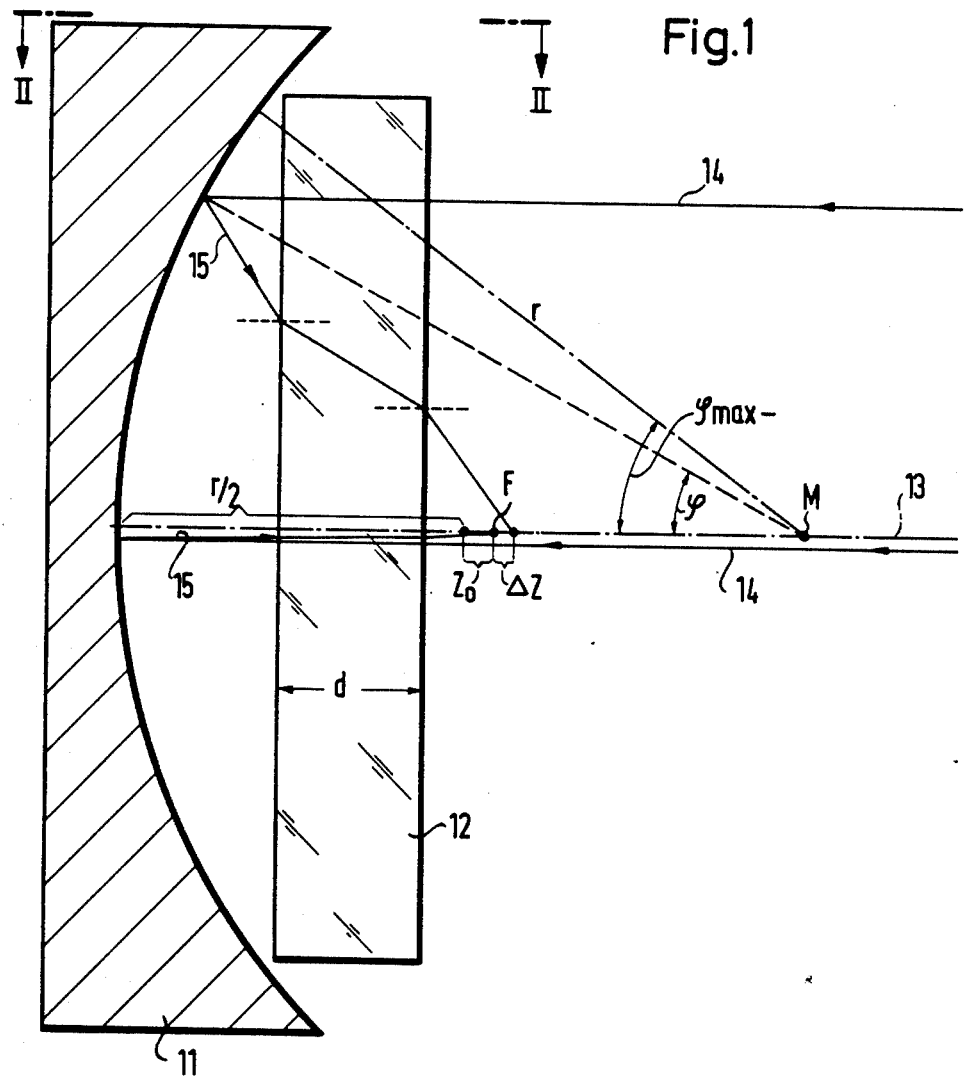
FIG. 1 a part sectional schematic side view of a basic embodiment of the optical apparatus according to the invention.

FIG. 1 shows a spherical concave mirror 11 with a useful angle range $\phi_{max}$, whereby the said range is measured from the centre M of concave mirror 11. The coplanar correction plate 12 according to the invention is arranged perpendicularly to the optical axis 13 of the concave mirror directly in front of the latter. For reasons of clarity of the parallel light beam 14 parallel to the optical axis 13 only one ray close to the axis and a further ray remote from the axis are shown. Both rays pass through the coplanar plate 12, initially without any displacement because they strike it in perpendicular manner. After reflection at the surface of the spherical concave mirror 11, the emergent rays 15, as represented, are displaced in a more or less parallel manner from coplanar plate 12. Taking account of the thickness d of the coplanar plate 12 and its reflective index n, the following amount is obtained for the focus displacement $z_o$ of rays close to the axis:

$$z_o = d(n - 1/n) \quad (1)$$

Thus, due to the arrangement of correction plate 12, the focus for rays close to the axis is no longer at $r/2$, but at $r/2 + z_o$. This point, designated by F must now be considered as the focus of the concave mirror/correction plate system.

The reflected rays 15 of the abaxial incident rays 14 generally do not precisely intercept the optical axis 13 at point F, but instead are displaced by an amount $\Delta z$ relative to F on the optical axis 13. As a function of the angle $\phi$ of the particular incident ray 14 the relationship between $\Delta z$ and $\phi$ is as follows:

$$\Delta z = \frac{d}{n} \cdot (1 - \frac{\cos 2}{\cos \arcsin \frac{1}{n} \cdot \sin 2\phi}) \quad (2)$$

It is now possible, for example, by means of the Chebyshev approximation, to fix an absolute error below a predetermined value for the entire useful angle range $2 \cdot \phi_{max}$.

It is stressed that the considerations based on FIG. 1 apply to an incident parallel beam. However, the corrective action of the coplanar plate 12 also applies for the reverse direction of the rays, i.e. 15 are rays coming from a central light source and 14 is a parallel light beam emanating from correction plate 12.

Figure 2:
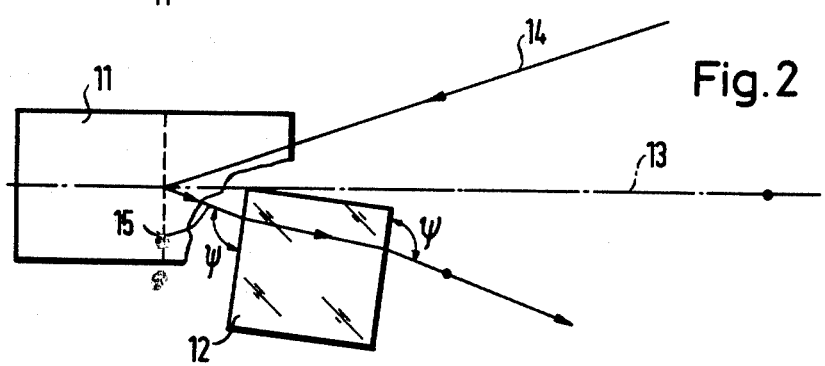
FIG. 2 a somewhat modified embodiment compared with FIG. 1 in a partly broken away view along the line II—II of FIG. 1.

FIG. 2 shows a view in the direction of the line II—II of FIG. 1, whereby however a slight modification has been made in that the parallel beam now no longer strikes concave mirror 11 parallel to optical axis 13, but now does so at an angle thereto. The coplanar plate 12 is displaced relative to optical axis 13 in such a way that the parallel beam 14 reaches concave mirror 11, without traversing the same. Only the reflected beam 15 passes through the coplanar plate 12.

According to the preferred embodiment shown diagrammatically in FIG. 2, the emergent beams 15 in the projection of FIG. 2 no longer strike the coplanar sides of plate 12 in a perpendicular manner, but at an angle $\phi$ of $>45°$. By suitably choosing the angle $\psi$ the formation of a curved scanning line on concave mirror 11 resulting from the inclination of parallel beam 14 can be substantially eliminated. The direction of the rays can also be reversed without difficulty in the case of FIG. 2, without impairing the corrective action of plate 12.

Figure 3:
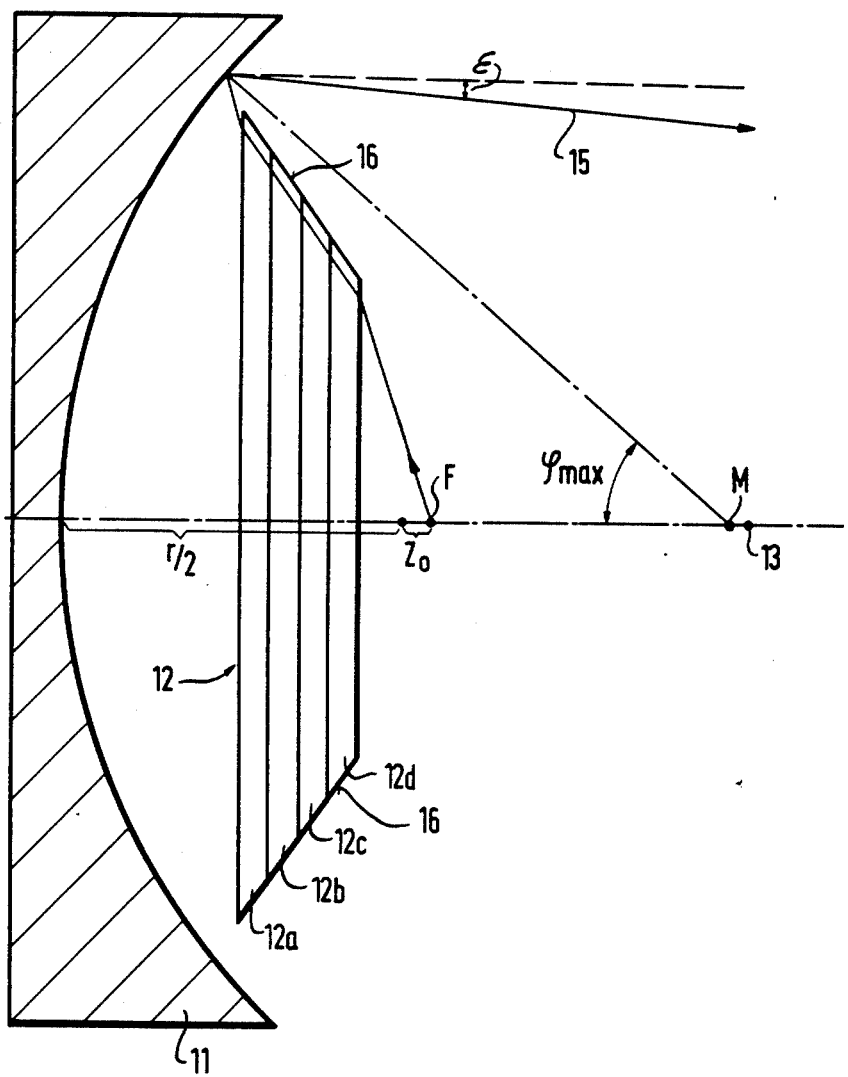
FIG. 3 similar view to FIG. 1 of a further embodiment of the optical apparatus according to the invention.

Relative to FIG. 3 it is shown what is meant by the spherical aberration $\epsilon$. If it is assumed that a light ray passes from focus F of the system to a particular point on concave mirror 11, which in FIG. 3 is assumed as the extreme outermost point corresponding to the maximum useful angle $\phi_{max}$, then $\epsilon$ designates the angle of emergent light beam 15 formed by the latter with a direction parallel to optical axis 13. On the basis of this consideration, it is clear that the displacement of the focus $\Delta z$ defined relative to FIG. 1 corresponds with the spherical aberration $\epsilon$. In other words, an incident light beam 14 directed parallel to the optical axis 15 and striking a particular point of concave mirror 11 undergoes a displacement of the focus $\Delta z$, whereas a light ray passing from focus F to the same point on concave mirror 11 after reflection forms an angle $\epsilon$ with the direction of the optical axis 13.

Compared with the embodiment of FIG. 1, FIG. 3 shows two further modifications. Firstly, the coplanar plate 12 comprises a total of four layers 12a, 12b, 12c, 12d, having different Abbe numbers in order to eliminate any chromatic aberrations. For reasons of simplicity, the layers are shown by straight lines, but in actual fact the boundary layers within the correction plate are convex.

In addition, the coplanar plate 12 according to FIG. 3 has inclined edges 16, so that overall a trapezoidal shape is obtained in the view of FIG. 3. The arrangement and direction of the inclined edges 16 are such that the outermost rays of the useful angular range $2\phi_{max}$ are just within the coplanar plate 12.

It can be gathered from the preceeding description that the maximum useful angle range $2\phi_{max}$ which is possible according to the invention is 90°, because at an angle of $\phi_{max}>45°$ the parallel rays reflected on the concave mirror would no longer be reflected into correction plate 12. When dimensioning the coplanar plate 12, it must be ensured that the light rays 15 which have entered the plate after reflection at concave mirror 11 pass out of plate 12 on the same side of the optical axis 13 as that on which they entered it.

Figure 4:
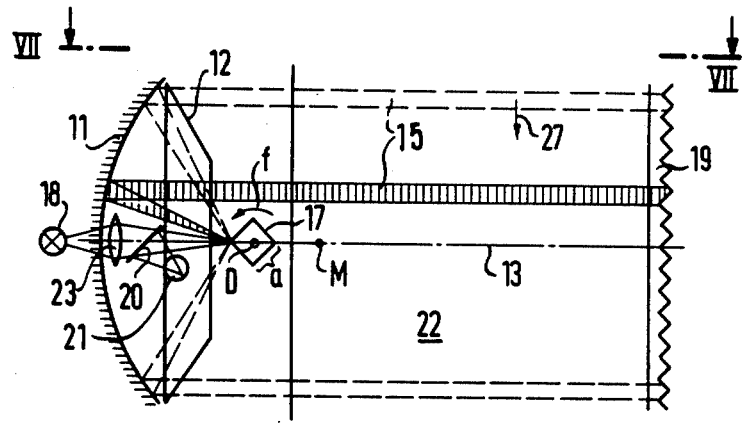
FIG. 4 a part sectional diagrammatical side view of a measuring light curtain equipped with the apparatus according to the invention.
Figure 8:
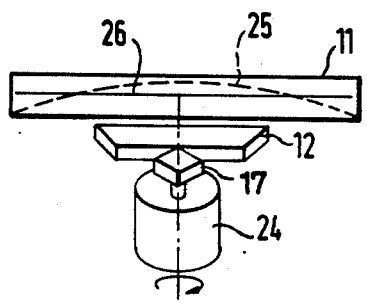
FIG. 8 a view of the object of FIG. 7 along the line VIII—VIII of FIG. 7.
Figure 7:
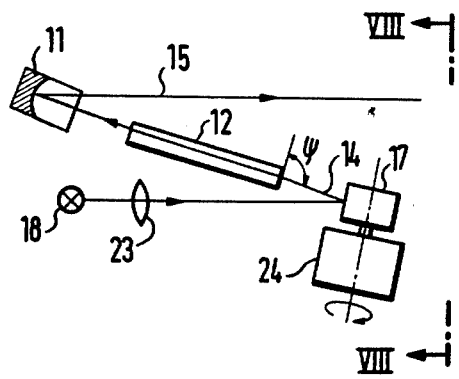
FIG. 7 a diagrammatic view of a similar measuring light curtain to FIG. 4 along the line VII—VII of FIG. 4.

The optical apparatus according to the invention is preferably used with a measuring light curtain 22 according to FIG. 4. According to FIG. 4, a light source 18, which preferably comprises a laser, illuminates via an optical system 23, a mirror wheel 17 on which is projected an image of the light source. As can be gathered particularly clearly from FIGS. 7 and 8, the correction plate 12 according to the invention is arranged between mirror wheel 17 and the spherical concave mirror 11. Plate 12 has the trapezoidal shape explained relative to FIG. 3 and in the view of FIG. 7 is tilted at an angle of $\psi>90°$ relative to the light rays passing through it in order to eliminate the above-mentioned astigmatism. Without this tilting of the correction plate, on rotating the mirror wheel 17 by means of a motor 24 a curved scanning line 25 would form on concave mirror 11 and is indicated by dotted lines in FIG. 8. By a suitable choice of angle $\psi$ a straight scanning line 26 can without difficulty be formed on concave mirror 11.

Concave mirror 1 reflects the light rays passing through correction plate 12 and directs them as a parallel emergent beam, for example onto a retroreflector 19 which can be constructed as a triple reflector. In this case, the light is reflected back onto itself and is diverted to a photoelectric receiver 21 by means of concave mirror 11, coplanar plate 12, mirror wheel 17 and a beam splitter 20.

In light curtain 22 is performed the measurement of objects located there by the scanning beam technique, i.e. a scanning beam preferably produced by a laser 18 is moved backwards and forwards parallel to itself over light curtain 22, as indicated by arrow 27. If it is assumed that the migration rate of scanning beam 15 is known, photoelectric receiver 21 supplies a signal, whose duration has a known relationship with the path displacement of the light ray. If an obstacle is placed in the measuring circuit, the measurement ray is interrupted for a short time, which is dependent on the thickness of the object. On the basis of this time, it is possible to determine the thickness of the obstacle, taking account of the migration rate of the scanning beam. In addition to this analogue evaluation, a digital evaluation is also possible, by using in per se known manner a timing scale and a further photoelectric cell, which are not shown. This not shown timing scale is preferably located at the light exit of the apparatus and is scanned by part of the scanning beam. By means of further optical aids and a second photoelectric cell, it supplies electrical pulses, which are proportional to the path displacement of the scanning beam. If an obstacle is located in the measuring area, the scanning beam is interrupted in accordance with the thickness of the obstacle, whereby the number of pulses during the interruption of the scanning beam is a measure of the width of the obstacle.

In the case of such measuring light curtains, the light ray must always be precisely parallel to the optical axis. This is particularly important if the object to be measured can have a random position between the vector and apparatus. To achieve this with a spherical concave mirror, the position of the mirror wheel 17 and the parameters of the coplanar plate 12 are according to the invention coordinated with one another.

Firstly, the centre of rotation of the mirror wheel is displaced relative to the centre M of concave mirror 11 in the direction of said mirror by a distance $$r/2 - a/2 + k$$

Figure 5:
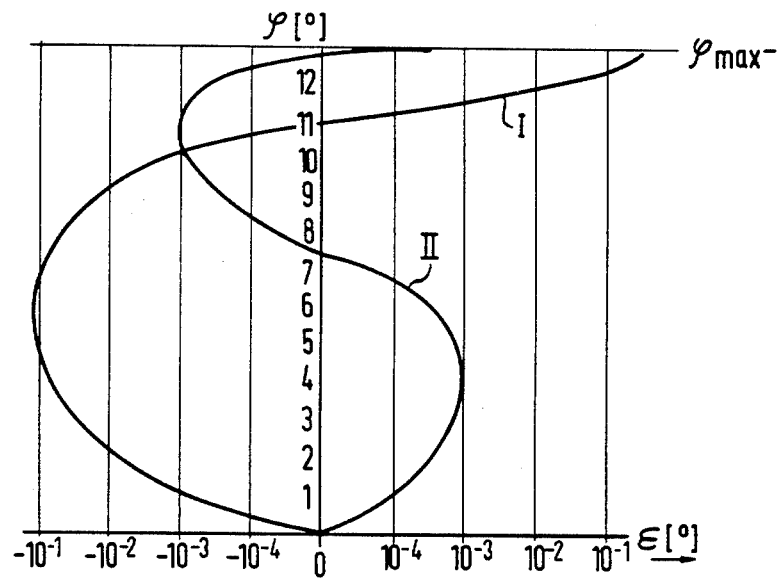
FIG. 5 a diagram showing the spherical aberration $\epsilon$ as a function of the angular distance $\phi$ of the considered point on the concave mirror.
Figure 6:
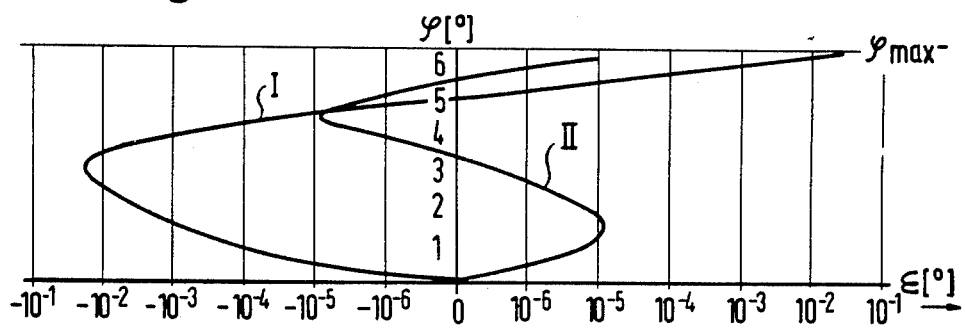
FIG. 6 an identical diagram to FIG. 5 for a different practical case.

Constant $k$ can be selected in such a way that a spherical aberration $\epsilon = 0$ is obtained not only for rays which are close to the axis but also for those which are at a certain distance from the optical axis. The error curve I in FIGS. 5 and 6 show how the constant $k$ can be selected in an optimum manner. For the complete useful angle range $\phi_{max}$ the absolute error should not for example exceed $10^{-1}$ (FIG. 5) or $10^{-2}$ (FIG. 6). FIG. 5 shows an example for a relatively large useful angle range of 13° and FIG. 6 for a relatively small aperture of about 6°. Both diagrams only give half the useful angle range, the other half being completely symmetrical.

Through the additional arrangement of the correction plate according to the invention and by suitable choice of the parameters of said plate 12, it is possible according to FIGS. 5 and 6 to completely eliminate the spherical aberration not only for rays close to the axis but also for two further rays remote from the axis. By the Chebyshev approximation, the individual parameters are varied until the absolute error remains below a predetermined value, which according to FIG. 5 is $10^{-3}$ and according to FIG. 6 $10^{-5}$.

As can be gathered from FIGS. 5 and 6, the spherical abberration $\epsilon$ is reduced by two or three decimal powers when using the coplanar plate according to the invention compared with using a mirror wheel without a correction plate. It should be noted that the spherical aberration $\epsilon$ in FIGS. 5 and 6 is shown in a logarithmic scale. By means of the correction plate according to the invention, a gradual and considerable improvement is made in connection with the spherical aberration of a spherical concave mirror.

When rotating the mirror wheel, the reflection point which reflects the incident light beam must always be located at such a point that the ray reflected towards the concave mirror always emanates from it in a parallel manner. However, as the mirror wheel cannot be made randomly large, even with the optimum arrangement at a distance $r/2 - a/2 + k$ from the centre of the concave mirror, there is still a slight deviation $\Delta x$ from the ideal reflection point at any time and this is represented mathematically as follows:

$$\Delta x = (r/2 - a/2 + k) \cdot (1/\cos \phi - 1) \quad (3)$$

By equating $\Delta x$ and $\Delta z$ and by varying the various parameters it is possible to form symmetrical error curves II according to FIGS. 5 and 6.

A particularly important finding of the Applicant is that for practical purposes, it is completely adequate if only two or three clearly defined points of the spherical aberration are reduced to zero, whereas it is sufficient if between these ideal points certain absolute values are not exceeded.

Whereas in the embodiment according to FIG. 4, a tetrahedral mirror wheel is shown, particular preference is given to mirror wheels with twelve mirrors, i.e. an angle of 30° per mirror. For manufacturing reasons, they have a maximum half useful angle range of $\psi = 15°$. However, they must always have an even number of faces.

The above statements clearly show that the spherical aberration can be substantially eliminated with the correction plate according to the invention alone. A mirror wheel with a larger diameter than zero leads to a considerable further improvement. In theory, extremely large a values would be advantageous, the diameters of mirror wheels having speeds of 3000 to 30000 r.p.m. are limited to 10 to 60 mm and an absolute maximum of 200 mm due to the maximum material strength.

As can be gathered more particularly from FIG. 1, the thickness d of the coplanar plate 12 is firstly determined by the position of the system focus F and secondly by the maximum useful angle $\phi_{max}$.

The invention is not limited to the embodiments described and represented hereinbefore and various modifications can be made thereto without passing beyond the scope of the invention.

What is claimed is:

1. Optical apparatus comprising a spherical mirror having an elongate, narrow, spherically concave reflecting mirror surface; light processing means disposed in front of the spherical mirror at a distance substantially equal to the focal length of the mirror and displaced from the optical axis of the spherical mirror for carrying out at least one of the following functions, namely projecting relatively sharply defined beams of light towards the mirror at sequentially varying angles to impinge at sequentially varying positions along the surface of the spherical mirror in its elongate direction for reflection thereat, and receiving relatively sharply defined beams of light at sequentially varying angles from sequentially varying positions along the surface of the spherical mirror following reflection thereat; and a plane parallel, transparent plate interposed between the spherical mirror and the light processing means and extending across the general plane in which the sequentially varying angles all lie, whereby light beams traversing the space between the mirror and the light processing means pass through the plate and the effects of spherical aberrations on the light beams are reduced by the plate; the plane parallel surfaces of the plate being inclined relative to the general plane by an angle other than 90° so that for light beams projected from the light processing means to the mirror, the inclination of the plate constrains the sequentially varying positions along the surface of the mirror to lie on a straight line, and so that light beams received by the light processing means after reflection at sequentially varying positions arranged along a straight line on the surface of the mirror are directed to a common point at the light processing means.

2. Optical apparatus according to claim 1 including a retroreflector positioned on the side of the light processing means opposite the mirror whereby light beams leaving the spherical mirror following transmission to the spherical mirror from said light processing means are reflected back to the spherical mirror for subsequent further reflection back to said light processing means.

3. Optical apparatus according to claim 1 wherein the plane parallel plate is disposed between the mirror and said light processing means to intercept only light beams traversing the space between the spherical mirror and said light processing means.

4. Optical apparatus according to claim 3 wherein the plane parallel plate has a trapezoidal shape defined by a pair of opposite, angularly inclined edges, and wherein the plate is disposed so that the inclined edges are substantially aligned with the paths of the light beams of greatest angular separation.

5. Apparatus according to claim 3 wherein said light processing means located in front of the spherical mirror comprises a rotating mirror wheel, adapted to produce in combination with said spherical mirror a parallel beam of light capable of continuously scanning across the aperture of the spherical mirror.

6. Apparatus according to claim 5 including a retroreflector facing said concave mirror and capable of reflecting said parallel scanning beam of light back on itself towards the concave mirror for subsequent further reflection by the spherical mirror and impingement on said rotatable mirror wheel, and means for receiving said light beam after reflection by said rotatable mirror wheel for producing an output signal representative of the presence of an obstacle in said scanning beam.

7. Apparatus according to claim 1 wherein the parallel plate comprises a plurality of transparent material layers having differing Abbe numbers.

8. Apparatus for the correction of spherical aberrations of a concave spherical mirror comprising in combination: a mirror defined by a concave spherically curved mirror surface having a focal point on its optical axis; means disposed proximate to and on a side of the focal point opposite the mirror and cooperating with the reflecting surface for processing light beams striking the reflective surface, each of the light beams having first and second portions lying on respective sides of a plane containing the optical axis, the second portions lying in a generally sector-shaped plane centered on the processing means and extending from the processing means to the reflecting surface; a plane parallel transparent plate positioned between the processing means and the reflective surface, the plane parallel plate having a size sufficient to intercept all second light beam portions and forming the sole optical element for correcting and substantially reducing spherical aberrations caused by the spherically curved reflective surface, the plate being dimensioned so that for first portions of light beams directed parallel to one another at the mirror surface, the second portions of the light beams converge substantially at the processing means and, for the second portions, directed at the mirror surface from the processing means, the first portions all lie substantially parallel to one another, the plane parallel surfaces of the plate being inclined at an angle other than 90° relative to the generally sector-shaped plane so that the first portions of light beams emanating from the processing means and reflected by the spherical surface lie in a substantially flat plane and the second portions of light beams which are aligned parallel to one another in a common plane and strike the spherical surface converge in a common plate at the processing means.

9. Apparatus according to claim 8 wherein the plate is spaced along the optical axis between the reflecting surface and a distance $$r/2 + d\cdot(n-1/n),$$

wherein r is the radius of the reflecting surface
d is the thickness of the transparent plate, and
n is the reflective index of the plate.

10. Apparatus for forming a light curtain by scanning a relatively narrow, parallel light beam emanating from a point light source over a desired area comprising in combination: a concave mirror defined by a relatively narrow, spherically shaped, concave reflecting surface having a focal point along its optical axis; a scanner having a plurality of planar reflectors rotatable about a pivot axis which intercepts the optical axis, the scanner being displaced from the focal axis and the pivot axis being spaced from the reflecting surface a distance equal to ½ the radius of the reflecting surface plus the distance between the pivot axis and the planar reflectors plus a constant; means for directing a light beam to the planar reflectors of the scanner for reflection onto the reflecting surface so that the rotating scanner angularly deflects the incoming light beam over a useful portion of the spherically shaped reflecting surface to thereby generate a scanning, reflected light beam which scans the area; a retroreflector opposite the mirror for retroreflecting the scanning light beam to the mirror, whereby the mirror redirects such beams to the scanner; means positioned to receive the redirected light beam for forming an output signal responsive to the intensity of such beam to indicate the presence or absence of an object in the area of the light curtain; and a transparent plate interposed between the concave reflecting surface and the scanner, the plate being dimensioned to intercept light beams reflected by the scanner to the spherically shaped surface and vice versa and having plane parallel surfaces which are inclined relative to the intercepted light beams to optically deflect the light beams between the spherically shaped surface and the scanner so that light beams between the spherically shaped surface and the retroreflector are substantially parallel to one another and lie in a common plane and light beams redirected by the spherically shaped surface towards the scanner substantially converge on the reflectors.

11. Optical beam scanning apparatus for producing a scanning beam using a spherical mirror corrected for spherical aberration in which light beams are directed along a series of substantially parallel paths in a substantially flat plane across an area being scanned, the apparatus comprising a spherically reflecting concave mirror surface, a light scanner disposed to one side of the corrected focal point of said mirror surface for serially directing an incident light beam into a plurality of radial directions in a sector shaped plane towards the mirror surface, the sector-shaped plane being inclined relative to the optical axis of the mirror surface, a plane parallel plate disposed between the light scanner and the mirror surface to intercept all the light beams passing therebetween, the plane parallel plate being the sole element for correcting for spherical aberration introduced by said mirror surface and for insuring that the light beams reflected into the scanned area are substantially parallel, and the plane parallel plate being inclined relative to the sector-shaped plane so that the plane containing the substantially parallel rays is substantially flat.

12. Optical beam scanning apparatus according to claim 11 including a retroreflector for returning the individual beams of the scanning beam back towards the mirror surface for reflection thereat, and detection means for scanning beams following their reflection at the mirror surface.

13. Optical beam scanning apparatus for detecting a scanning beam comprising a series of light beams directed along parallel paths in a flat plane using a spherical mirror corrected for spherical aberration, the apparatus comprising a spherically reflecting concave mirror surface disposed to receive the light beams with its optical axis inclined relative to the flat plane, a light processing device disposed adjacent the corrected focal point of the mirror surface on the other side of the optical axis relative to the flat plane and adapted to receive light beams converging in a generally sector-shaped plane from the mirror surface towards the light processing means, and a plane parallel plate disposed between the mirror surface and the light processing means to intercept all the light beams passing therebetween, the plane parallel plate being the sole element for correcting for spherical aberration introduced by the mirror surface, the plane parallel plate including parallel faces which are inclined relative to the sector-shaped plane so that the light beams are focused onto a common point at the light processing means.

* * * * *